United States Patent
Matsuhira (10) Patent No.: US 8,125,680 B2
(45) Date of Patent: Feb. 28, 2012

(54) IMAGE PROCESSING APPARATUS AND CONTROL METHOD THEREOF

(75) Inventor: Masatoshi Matsuhira, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 539 days.

(21) Appl. No.: 12/271,656

(22) Filed: Nov. 14, 2008

(65) Prior Publication Data

US 2009/0128834 A1    May 21, 2009

(30) Foreign Application Priority Data

Nov. 16, 2007  (JP) ................................. 2007-298274

(51) Int. Cl.
- *G06F 3/12* (2006.01)
- *G06K 15/10* (2006.01)
- *G06K 9/38* (2006.01)
- *G06K 9/32* (2006.01)
- *H04N 1/60* (2006.01)
- *H04N 5/262* (2006.01)
- *H04N 5/217* (2011.01)

(52) U.S. Cl. ............ 358/1.2; 358/1.1; 358/1.5; 358/1.9; 358/1.15; 358/1.18; 348/239; 348/241; 348/222.1; 348/78; 382/296; 382/272; 382/300

(58) Field of Classification Search ........ 358/1.11–1.18, 358/1.2, 1.9; 382/296, 274, 300
See application file for complete search history.

(56) References Cited

U.S. PATENT DOCUMENTS

| | | | |
|---|---|---|---|
| 7,764,846 B2 * | 7/2010 | Marchesotti et al. | 382/274 |
| 7,773,830 B2 * | 8/2010 | Nohara | 382/296 |
| 7,812,864 B2 | 10/2010 | Kuboi | |
| 7,957,611 B2 * | 6/2011 | Zhu et al. | 382/300 |
| 2005/0174448 A1 * | 8/2005 | Kuboi | 348/239 |
| 2006/0039478 A1 | 2/2006 | Nonaka | |
| 2008/0211938 A1 * | 9/2008 | Kuboi | 348/241 |

FOREIGN PATENT DOCUMENTS

| | | |
|---|---|---|
| JP | 2002-271794 | 9/2002 |
| JP | 2005167697 A | 6/2005 |
| JP | 2005-223858 | 8/2005 |
| JP | 2005223858 A | 8/2005 |
| JP | 2006048223 A | 2/2006 |
| JP | 2006060540 A | 3/2006 |
| JP | 2007004455 A | 1/2007 |
| JP | 2007088686 A | 4/2007 |
| JP | 2007-251927 | 9/2007 |

* cited by examiner

*Primary Examiner* — Mark K Zimmerman
*Assistant Examiner* — Satwant Singh
(74) *Attorney, Agent, or Firm* — DLA Piper LLP (US)

(57) ABSTRACT

An image processing apparatus. First reducing means generates a first reduced size image by reducing an original image. Second reducing means generates a second reduced size image having a size larger than that of the first reduced size image and smaller than that of the original image by enlarging the first reduced size image. Red-eye correction means detects a red-eye position based on the second reduced size image and performs red-eye correction processing based on the detected red-eye position.

9 Claims, 6 Drawing Sheets

IMAGE PROCESSING APPARATUS AND CONTROL METHOD THEREOF

CROSS REFERENCES TO RELATED APPLICATIONS

The present invention claims the benefit of priority under 35 USC 119 of Japanese Patent Application No. 2007-298274 filed in the Japanese Patent Office on Nov. 16, 2007, the entire contents of which are incorporated herein by reference.

BACKGROUND

1. Technical Field

The present invention relates to an image processing apparatus and a control method thereof, and more particularly, to an image processing apparatus and a control method thereof that reduces the amount of memory use during execution of image recognition processing.

2. Related Art

Among image processing apparatuses such as printers, an apparatus is known that generates a reduced size image by preliminarily sampling an image, performing image recognition processing based on the reduced size image, and then performing actual image processing. For example, a printer is known that performs image recognition processing, e.g., red-eye correction processing or automatic image correction processing, based on the sampled reduced size image and then performs printing of the image.

Red-eye correction processing is processing for detecting red-eye defects in an image of a human or the like generated at the time of capturing to thereby correct the red-eye defects to a state where the red-eye defects are removed. Automatic image correction processing, also known as APF (Auto Photo Fine), is processing for acquiring statistical information on brightness, saturation, luminance, and the like of an overall image to thereby optimize the balance between the brightness, saturation, and luminance based on the statistical information. When the automatic image correction processing is performed, face recognition processing is also performed to recognize and detect the face of a human or the like in an image, and then, color correction is performed so that the flesh color of the face is clearly seen.

When the image recognition processing is performed, a reduced size image is sufficient and it is not necessary to use a full size image based on original image data (see, for example, Japanese Patent Application Laid-Open No. 2002-271794).

However, the size of the reduced size image necessary for performing the image recognition processing differs depending on the contents of the processing. For example, while an image size of QVGA (320×240 pixels) is sufficient for the automatic image correction processing or the face recognition processing described above, an image size of VGA (640× 480 pixels) or more is required in order to perform the red-eye correction processing with a high degree of precision.

When both of the processing operations are to be performed simultaneously, the processing operations may be performed simply based on a reduced size image having the larger size, i.e., VGA or more. However, a memory capacity of about 900 KB is required for holding RGB image data of a VGA-size image, which may be a great load to an image processing apparatus having a small memory capacity. This is particularly so in an embedded type printer having such image recognition processing preliminarily embedded therein since a memory mounted therein has a small memory size, and thus, there may be a case where sufficient memory capacity is secured therein for the image recognition processing.

Moreover, some image processing apparatuses are configured to display reduced size images on a GUI (graphical user interface) screen at high speed. For such high-speed display, the reduced size images are preliminarily generated from original image data by using an idle period of a CPU. The generated reduced size images are stored in a cache memory so that the cached reduced size images are read and displayed when necessary on the GUI screen.

In order for the image processing apparatuses to perform the image recognition processing using the cached reduced size images, the generated reduced size images need to have the VGA size. However, a large memory capacity must be secured in order to cache twenty pieces of reduced size images, for example, and hence, the cost increases by that amount.

On the other hand, a method may be considered in which without using the cached reduced size images, VGA-size images are generated based on original image data whenever the image recognition processing is performed. However, a surplus period of time may be required for the image generation. This is particularly so because the image recognition processing is often performed immediately before a printer starts a printing operation. Thus, the period of time consumed for generating the reduced size images corresponds to a user's print waiting time. Thus, the user's print waiting time is increased and usability of the image processing apparatuses is degraded.

SUMMARY

An advantage of some aspects of the invention is that it provides an image processing apparatus and a control method thereof that reduces the amount of memory use during execution of image recognition processing for detecting a red-eye position while suppressing an increase in a user's waiting time.

According to an aspect of the invention, an image processing apparatus is provided that includes first reducing means for generating a first reduced size image by reducing an original image; second reducing means for generating a second reduced size image having a size larger than that of the first reduced size image and smaller than that of the original image by enlarging the first reduced size image; and red-eye correction means for detecting a red-eye position based on the second reduced size image and performing red-eye correction processing based on the detected red-eye position.

In this case, an interpolation algorithm used when the first reducing means generates the first reduced size image may be the same as an interpolation algorithm used when the second reducing means generates the second reduced size image.

Moreover, the interpolation algorithm may be an algorithm capable of making image information compressed during reduction of the original image to be embedded in the first reduced size image and extracting the embedded image information when the second reduced size image is generated by enlarging the first reduced size image.

Furthermore, the first reducing means may generate the first reduced size image using a bi-linear method, and the second reducing means may generate the second reduced size image using the bi-linear method.

Furthermore, the first reducing means may generate the first reduced size image using a bi-cubic method, and the second reducing means may generate the second reduced size image using the bi-cubic method.

Furthermore, an interpolation algorithm used when the first reducing means generates the first reduced size image may be different from an interpolation algorithm used when the second reducing means generates the second reduced size image.

Furthermore, the image processing apparatus may also include print execution means for performing a printing operation on an image that has been subjected to the red-eye correction processing by the red-eye correction means.

According to another aspect of the invention, a control method of an image processing apparatus is provided comprising the steps of: generating a first reduced size image by reducing an original image; generating a second reduced size image having a size larger than that of the first reduced size image and smaller than that of the original image by enlarging the first reduced size image; and detecting a red-eye position based on the second reduced size image and performing red-eye correction processing based on the detected red-eye position.

BRIEF DESCRIPTION OF THE DRAWINGS

The invention will be described with reference to the accompanying drawings, wherein like numbers reference like elements.

DESCRIPTION OF EXEMPLARY EMBODIMENTS

Exemplary embodiments are now described with reference to accompanying drawings. It is to be noted that the technical scope of the present invention is not limited to the embodiments described below.

Figure 1:
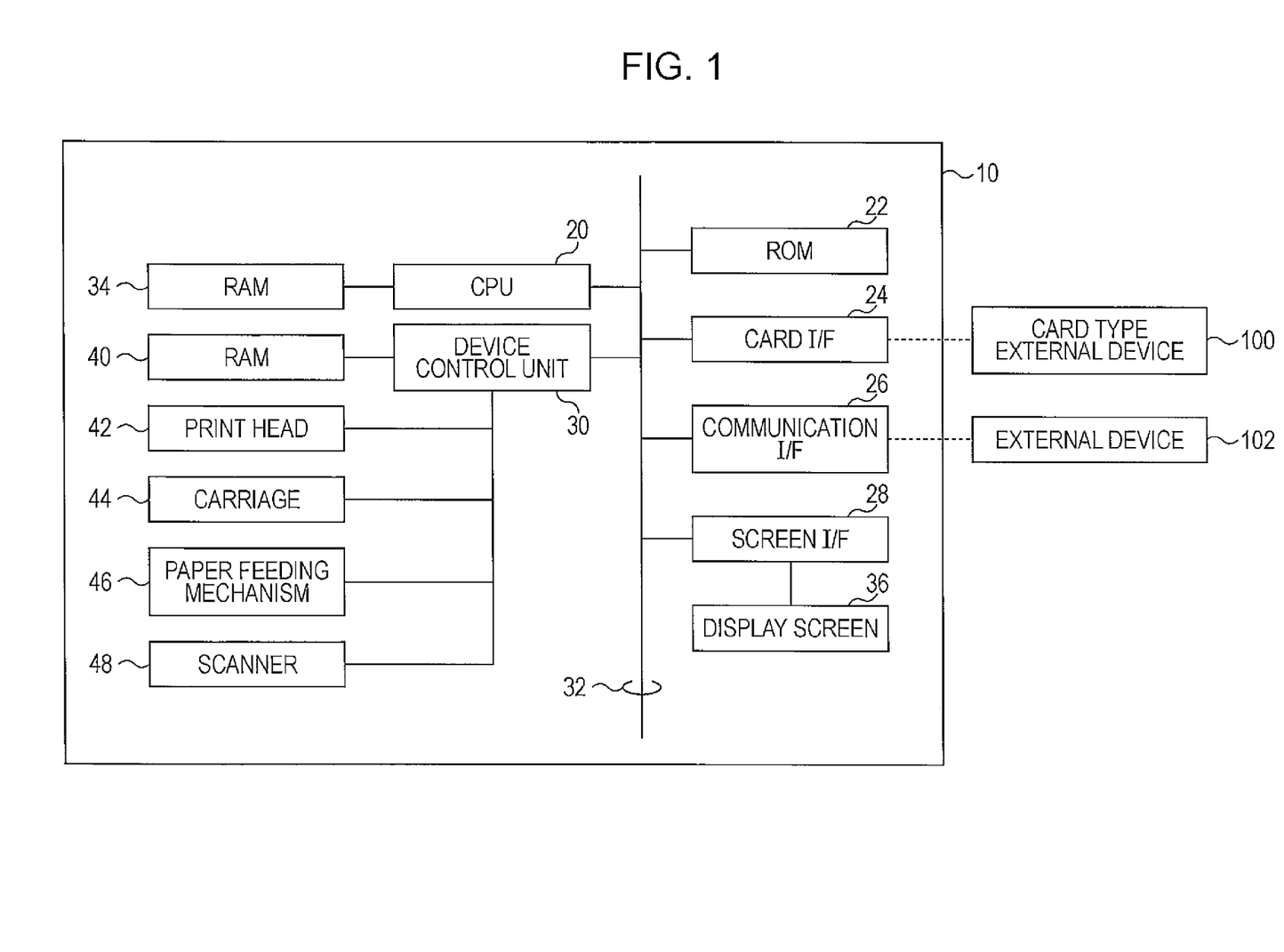
FIG. 1 is a block diagram illustrating an example of an internal configuration of an image processing apparatus according to an embodiment of the present invention.

FIG. 1 is a block diagram of an example of an internal configuration of an image processing apparatus 10 according to an embodiment of the present invention. As will be understood from FIG. 1, the image processing apparatus 10 according to the present embodiment is configured as a printer, and more particularly, as a color ink jet printer. However, the image processing apparatus 10 is not limited to a printer and may be an image display apparatus such as a photo viewer.

As illustrated in FIG. 1, the image processing apparatus 10 includes a CPU (central processing unit) 20, a ROM (read only memory) 22, a card interface 24, a communication interface 26, a screen interface 28, and a device control unit 30, which are connected with each other via an internal bus 32.

A RAM (random access memory) 34, which is a specific-purpose volatile storage device, is connected to the CPU 20. For example, the CPU 20 carries out a variety of controls of the image processing apparatus 10 by reading and executing a variety of programs stored in the ROM 22. During execution of the programs, the CPU 20 stores temporary data in the RAM 34 on an as needed basis.

The ROM 22 is a nonvolatile storage device and stores therein a variety of programs or data used in the image processing apparatus 10 in a nonvolatile manner. The card interface 24 is an interface through which a card type external device 100 such as a PC card is inserted into the image processing apparatus 10. Examples of the PC card include a flash memory card, a hard disc, a SCSI card, and a modem card.

The communication interface 26 is an interface through which a variety of types of external devices 102, e.g., an image capturing device such as a camera, a notebook, and a desktop type personal computer are connected to the image processing apparatus 10. The connection specification used for connection between the image processing apparatus 10 and the external device 102 may be a wired communication standard such as USB or RS-232C and a wireless communication standard such as IrDA or Bluetooth.

The screen interface 28 is an interface of a display screen 36 provided in the image processing apparatus 10. The display screen 36 may be an LCD (liquid crystal display), for example. In the present embodiment, reduced size images are displayed on the display screen 36 so that a user is able to arbitrarily select an image to be printed. Moreover, the display screen 36 may be a touch panel and thus may serve as a user interface through which the user inputs instructions to the image processing apparatus 10.

The device control unit 30 is connected to a RAM 40, a print head 42, a carriage 44, a paper feeding mechanism 46, and a scanner 48 and performs mechanical control on the print head 42, the carriage 44, the paper feeding mechanism 46, and the scanner 48. The RAM 40 is a volatile storage device specific to the device control unit 30, in which data necessary for the device control unit 30 to perform the mechanical control is stored temporarily. The device control unit 30 may be an ASIC (application specific IC), for example.

In the present embodiment, the device control unit 30 performs overall control of a printing operation by means of the print head 42, the carriage 44, and the paper feeding mechanism 46. That is, the printing operation is performed on a printing medium such as paper while causing the print head 42 mounted on the carriage 44 to discharge printing ink therefrom and causing the carriage 44 to reciprocate in a scanning direction (a direction intersecting a paper feeding direction). The paper feeding mechanism 46 sequentially feeds the printing medium such as paper in the paper feeding direction in a synchronized manner with the printing operation by means of the carriage 44, whereby the printing operation is performed on the printing medium.

The device control unit 30 also controls an image reading operation by means of the scanner 48. For example, the device control unit 30 controls a series of processing operations for reading a document set, by a user, on an image reading surface of the scanner 48 by means of a line image sensor and temporarily stores the read document image in the RAM 44 as image data.

Figure 2:
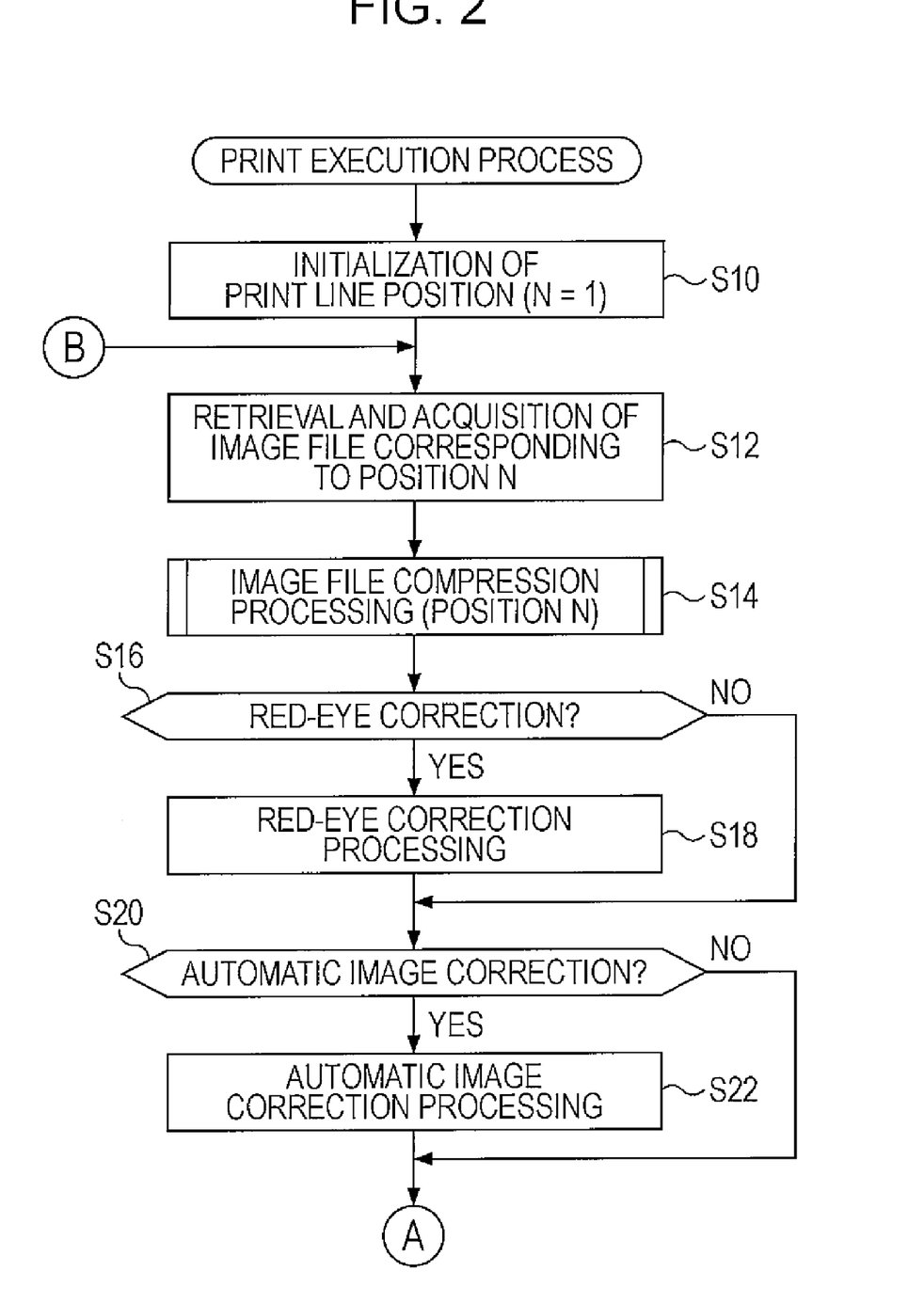
FIG. 2 is a flow chart illustrating an example of print execution processing executed by the image processing apparatus according to the present embodiment.
Figure 3:
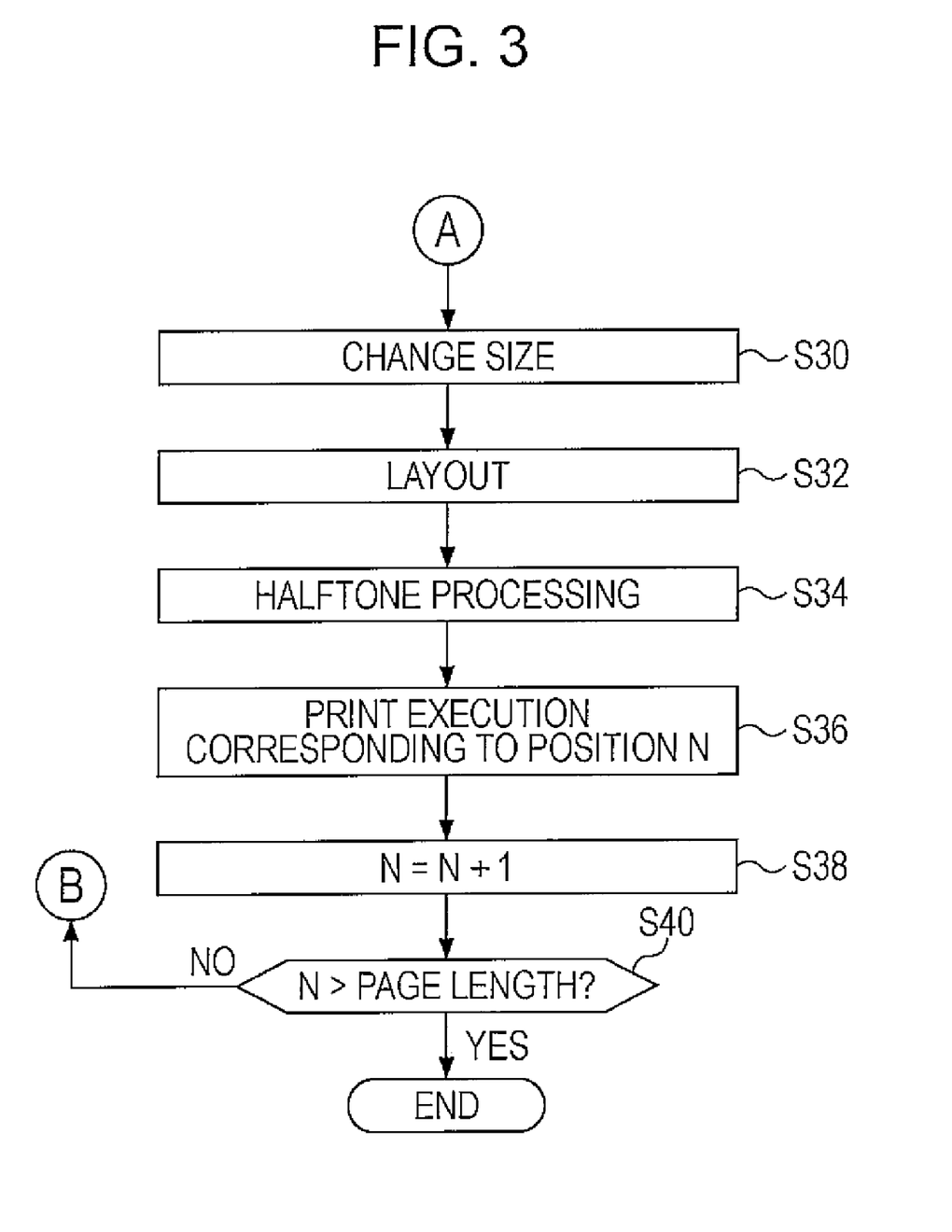
FIG. 3 is another flow chart illustrating an example of the print execution processing executed by the image processing apparatus according to the present embodiment.

A print execution processing executed by the image processing apparatus 10 is described with reference to FIGS. 2 and 3. FIGS. 2 and 3 are flow charts illustrating an example of the print execution processing executed by the image processing apparatus 10. The print execution processing is realized by the CPU 20 reading and executing a print execution processing program stored in the ROM 22, for example. Moreover, the print execution processing is activated by a user issuing a print command to the image processing apparatus 10 with designation of an image to be subjected to the printing operation, a layout, and the like.

First, as illustrated in FIG. 2, the image processing apparatus 10 initializes a print line position to set a variable N to 1 (step S10). That is, the print line position is set to the beginning point of a page of the printing medium.

Next, the image processing apparatus 10 retrieves and acquires an image file of an image corresponding to the print line position N (step S12). For example, in a case where an image designated by a user to be printed is stored in the card type external device 100, the image processing apparatus 10 retrieves and acquires the image data of the image designated by the user from the card type external device 100. Moreover, in a case where the image data is read into the RAM 34, the image file corresponding to the print line position N is acquired from the RAM 34. In this case, when a plurality of image files is required for printing the image corresponding to the print line position N, all the necessary image files are acquired.

Next, the image processing apparatus 10 performs decompression processing on the image file acquired in step S12, of the image corresponding to the print line position N (step S14). A detailed description of the decompression processing will be provided later.

Next, the image processing apparatus 10 determines whether or not the user has designated to perform red-eye correction processing (step S16). When the user has designated to perform the red-eye correction processing (Yes in step S16), the red-eye correction processing is performed on the image obtained through the decompression in step S14 (step S18). The image data of the image that has been subjected to the red-eye correction processing is stored in a data buffer. On the other hand, when the user has not designated to perform the red-eye correction processing (No in step S16), the processing of step S18 is skipped.

Next, the image processing apparatus 10 determines whether the user has designated to perform automatic image correction processing (step S20). When the user has designated to perform the automatic image correction processing (Yes in step S20), the automatic image correction processing is performed on the image obtained through the decompression in step S14 (step S22). That is, statistical information on brightness, saturation, luminance, and the like of an overall image is acquired to thereby optimize the balance between the brightness, saturation, and luminance based on the statistical information. The image data of the image that has been subjected to the automatic image correction processing is stored in the data buffer. On the other hand, when the user has not designated to perform the automatic image correction processing (No in step S20), the processing of step S22 is skipped.

Next, as illustrated in FIG. 3, the image processing apparatus 10 changes an image size to a size designated by the user (step S30). The image processing apparatus 10 then arranges the obtained images in a designated layout (step S32). For example, when a plurality of images is arranged in a scanning direction of the print line position N, the image processing apparatus 10 arranges the plurality of images in the designated layout.

Next, the image processing apparatus performs halftone processing on the image obtained through the processing in step S32 (step S34) and then executes a printing operation corresponding to the print line position N (step S36). That is, the carriage 44 is moved in the scanning direction to carry out the printing operation corresponding to the print line position N.

Next, the image processing apparatus 10 increments the variable N by 1 (step S38) and then makes a determination as to whether the variable N has exceeded a page length of the printing medium (step S40). That is, it is determined whether or not the printing operation has been performed up to the ending point of the page of the printing medium. When the variable N is equal to or smaller than the page length of the printing medium (No in step S40), the above-described processing operations starting from step S12 are repeated.

On the other hand, when the variable N has exceeded the page length of the printing medium (Yes in step S40), that is, when the printing operation has been performed up to the ending point of the recording medium, the image processing apparatus 10 finishes the print execution processing.

Figure 4:
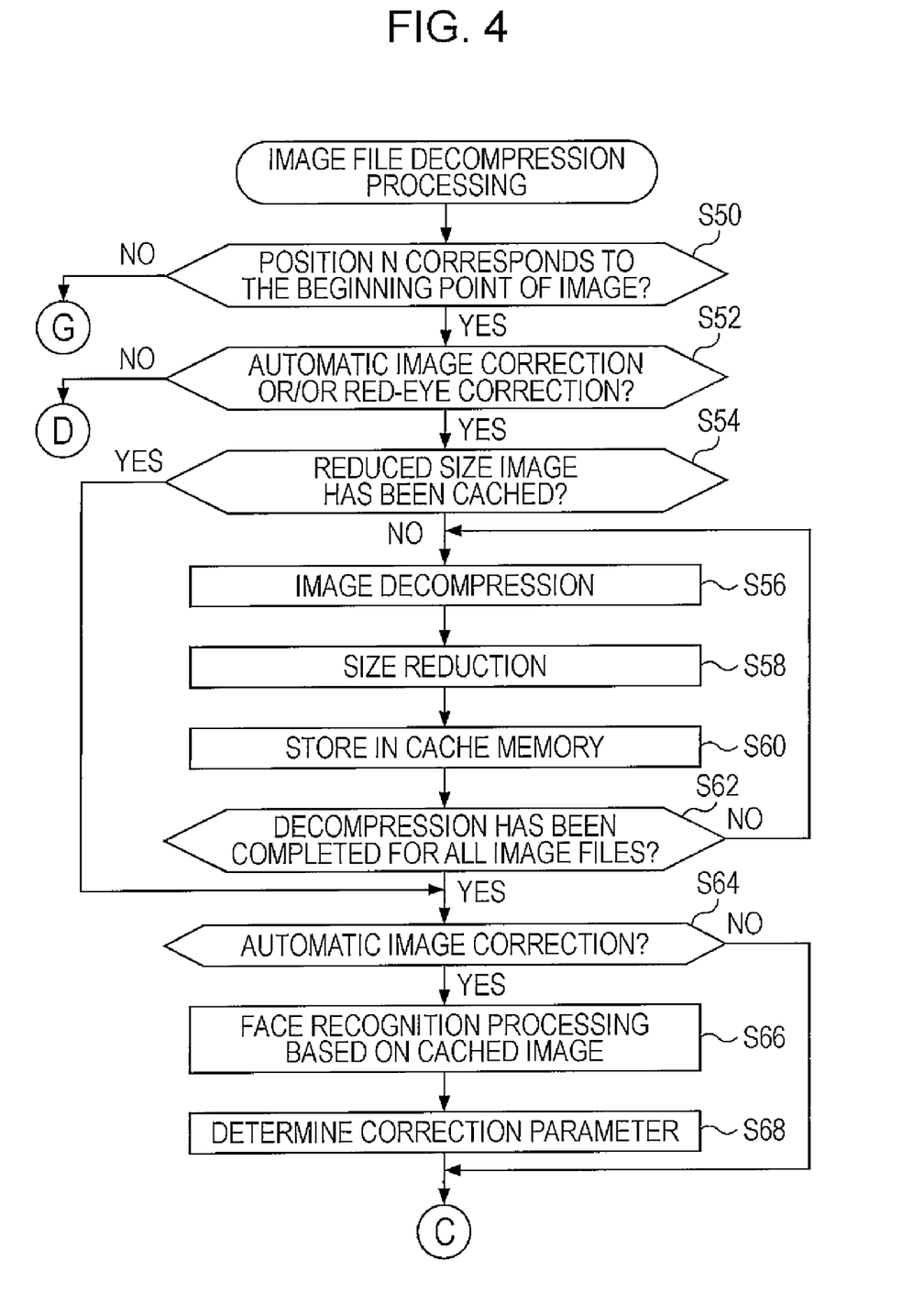
FIG. 4 is a flow chart illustrating an example of image file decompression processing executed by the image processing apparatus according to the present embodiment.
Figure 5:
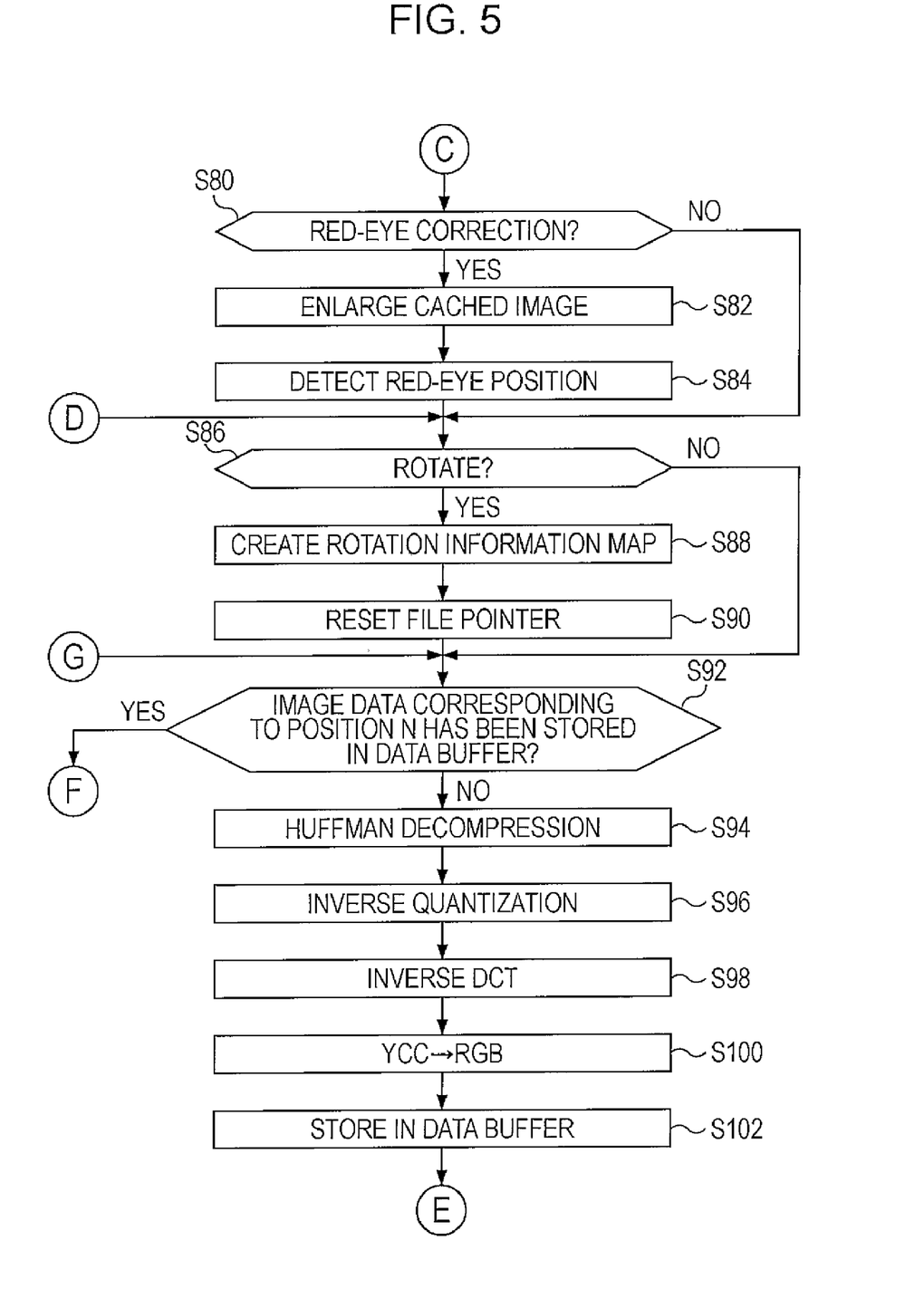
FIG. 5 is another flow chart illustrating an example of the image file decompression processing executed by the image processing apparatus according to the present embodiment.
Figure 6:
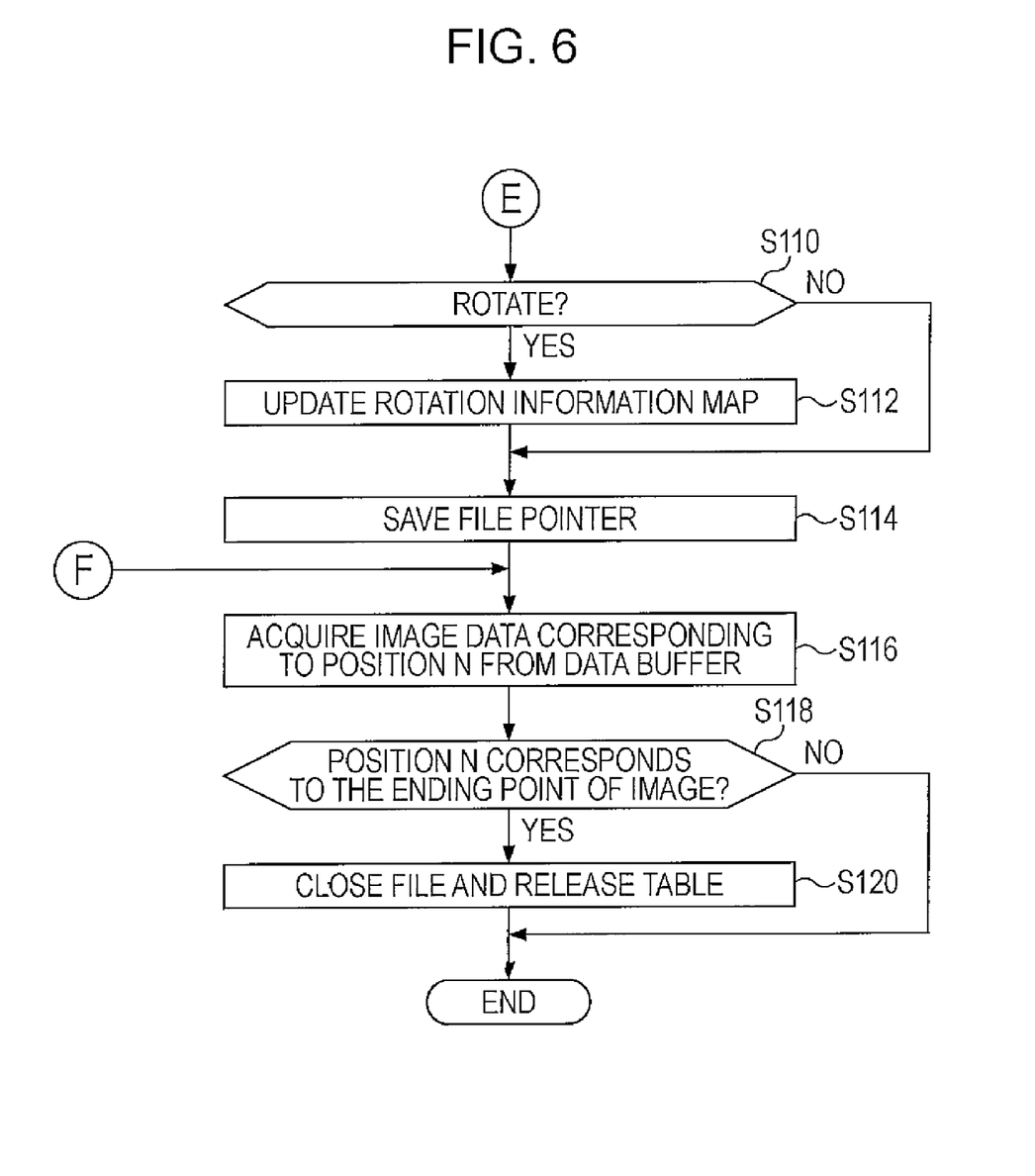
FIG. 6 is a further flow chart illustrating an example of the image file decompression processing executed by the image processing apparatus according to the present embodiment.

Next, the image file decompression processing executed by the image processing apparatus 10 is described with reference to FIGS. 4-6. FIGS. 4-6 are flow charts illustrating an example of the image file decompression processing executed by the image processing apparatus 10. The image file decompression processing may be realized by the CPU 20 reading and executing a print execution processing program stored in the ROM 22, for example. Moreover, the image file decompression processing is the processing executed in step S14 of FIG. 2.

First, as illustrated in FIG. 4, the image processing apparatus 10 determines whether the print line position N corresponds to the beginning point of the image (step S50). That is, it is determined whether or not a portion corresponding to the beginning point of the image is included in the print line position N. When the print line position N corresponds to the beginning point of the image (Yes in step S50), a determination is made as to whether or not the user has designated to perform at least one of the automatic image correction processing and the red-eye correction processing (step S52).

When the user has designated to perform at least one of the automatic image correction processing and the red-eye correction processing (Yes in step S52), a determination is made as to whether or not the reduced size image of the image to be subjected to the processing is present in a cache memory (step S54). For example, in the present embodiment, since the cache memory is formed in the RAM 34, the image processing apparatus 10 determines whether or not the reduced size image of the image to be subjected to the processing is present in a cache memory area of the RAM 34. Moreover, when a plurality of images is included in the print line position N, a determination is made as to whether or not all the reduced size images of the plurality of images are present in the cache memory.

In the present embodiment, the image processing apparatus 10 generates the reduced size image based on the image file stored in the card type external device 100 by using an idle period of the CPU 20. For example, the image files of the original image data, of a format, e.g., JPG, are stored in the card type external device 100. The reduced size images of a size of QVGA (320×240 pixels), for example, are sequentially generated based on the image files and stored in the cache memory. The reduced size images are displayed on the display screen 36 when necessary by reading data of the reduced size images of the QVGA size stored in the cache memory.

By doing so, a user's waiting time during the displaying of the reduced size images on the display screen 36 is reduced. This is particularly so when a plurality of reduced size images is displayed on the display screen 36 in a list arrangement. In such a case, when all the reduced size images are generated from the original image in response to the occurrence of the necessity thereof, the generation may require some processing time. For this reason, by preliminarily generating the reduced size images using the idle period of the CPU 20, the time required for completing the displaying of a list of reduced size images is greatly reduced.

Moreover, in the present embodiment, an interpolation algorithm based on a bi-linear method or a bi-cubic method is used when the CPU 20 generates the reduced size images from the original image. The bi-linear and bi-cubic methods are examples of compression methods that extract or reproduce image information that has been embedded during reduction of a reduced size image when the reduced size image is enlarged using the same interpolation algorithm. As a matter of course, the information that has been removed during the reduction cannot be reproduced.

When it is determined in step S54 that the reduced size images of the image to be subjected to the processing are not present in the cache memory (No in step S54), the image processing apparatus 10 performs decompression processing on the image files as the processing subject (step S56). For example, when the image files acquired in step S12 have a JPG format, decompression processing is carried out on the image files of the JPG format.

Next, the image processing apparatus 10 performs reduction processing on the image obtained through the processing in step S56 (step S58). That is, in the present embodiment, the size of the original image obtained in step S56 is reduced to a QVGA size. When the original image is reduced, an interpolation algorithm such as the bi-linear method or the bi-cubic method is used. Moreover, when the images of the JPG format being compressed in step S56 have a predetermined compression rate such as ½, ¼ or ⅛, the images may be decompressed in the compressed state. In this case, the processing of step S58 may be omitted.

Next, the image processing apparatus 10 stores the generated reduced size images of the QVGA size in the cache memory (step S60). That is, the reduced size images generated in step S58 are stored in the cache memory area of the RAM 34.

Next, the image processing apparatus 10 determines whether or not the image files of the entire images as the processing subject have been decompressed (step S62). When the image as the processing subject has a plurality of image files, the image processing apparatus 10 determines whether or not the reduced size images of the entire images as the processing subject have been stored in the cache memory.

When the image files of the entire images as the processing subject have not yet been decompressed (No in step S62), the flow returns to step S56, where the decompression processing is continued on a subsequent image file.

On the other hand, when the image files of the entire images as the processing subject have been decompressed (Yes in step S62), and when the reduced size images of the entire images as the processing subject have been stored in the cache memory (Yes in step S54), the image processing apparatus 10 determines whether the user has designated to perform the automatic image correction processing (step S64).

When the user has designated to perform the automatic image correction processing (Yes in step S64), the image processing apparatus 10 performs face recognition processing based on the reduced size images of the QVGA size stored in the cache memory (step S66). Since a human face has a size to some extent, it is possible to recognize the face with a high degree of precision using the reduced size images of the QVGA size smaller than the VGA size and to thereby decrease the processing time. For this reason, in the present embodiment, the face recognition processing is performed using the reduced size images of the QVGA size stored in the cache memory.

Next, the image processing apparatus 10 determines a parameter for performing color correction so that a flesh color of an image of the recognized face, a background and the like are clearly seen (step S68). That is, a parameter for optimizing the balance between brightness, saturation, and luminance is determined through statistical computation on the overall image. In step S22 described above, the automatic image correction processing is performed based on the determined parameter.

Next, when it is determined in step S64 or after the processing of step S68 that the user has not designated to perform the automatic image correction processing (No in step S64), the image abstraction process 10 determines whether or not the user has designated to perform the red-eye correction processing as illustrated in FIG. 5 (step S80).

When the user has designated to perform the red-eye correction processing (Yes in step S80), the image processing apparatus 10 enlarges the reduced size image (hereinafter referred to as a first reduced size image) stored in the cache memory to thereby generate a second reduced size image (step S82). Specifically, the image processing apparatus 10 enlarges the reduced size image of the QVGA size (320×240 pixels) stored in the cache memory to thereby generate a reduced size image of a VGA size (640×480 pixels).

An interpolation algorithm used for enlarging the first reduced size image stored in the cache memory to thereby generate the second reduced size image is the same as an interpolation algorithm used for generating the first reduced size image. For example, when the first reduced size image stored in the cache memory has been generated using a bi-linear method, the image is enlarged using the bi-linear method. On the other hand, when the first reduced size image stored in the cache memory has been generated using a bi-cubic method, the image is enlarged using the bi-cubic method. That is, when the first reduced size image stored in the cache memory has been generated using the bi-linear method or the bi-cubic method, the image is enlarged using the same bi-linear method or the same bi-cubic method. Therefore, it is possible to reproduce the image information having been convoluted into the first reduced size image during the reduction. Moreover, the second reduced size image is an image having a VGA size and is therefore smaller than the original image of the image file of the JPG format.

Next, the image processing apparatus 10 detects a red-eye position using the second reduced size image generated in step S82 (step S84). That is, the red-eye position is detected, not based on the reduced size image having the QVGA size, but based on the reduced size image having the VGA size larger than the QVGA size. In this manner, by detecting the red-eye position using the reduced size image having the larger size, the degree of precision in detection of the red-eye position is improved. When the red-eye position has been detected in step S84, the red-eye correction processing is performed in step S18 based on the detected red-eye position.

When it is determined in step S80 or after the processing of step S84 that the user has not designated to perform the red-eye correction processing (No in step S80), or when it is determined in step S52 that the user has designated to perform neither the automatic image correction processing nor the red-eye correction processing (No in step S52), the image processing apparatus 10 determines whether or not the image as the processing subject is an image that needs to be rotated (step S86). That is, since some images may need to be rotated by 90 degrees in the clockwise direction or the counterclockwise direction prior to being printed, it is determined whether or not such designation has been made.

When the image as the processing subject is an image that needs to be rotated (Yes in step S86), the image processing apparatus 10 creates rotation information map (step S88). Next, the image processing apparatus 10 resets a file pointer for identifying a position among the image to which the decompression processing has been performed (step S90).

When it is determined in step S86 or after the processing of step S90 that the image as the processing subject is not the image that needs to be rotated (No in step S86), or when it is determined in step S50 that the beginning point of the image is not included in the print line position N (No in step S50), the image processing apparatus 10 determines whether or not the image data corresponding to the print line position N are present in the data buffer (step S92). That is, it is determined whether or not the image data corresponding to the print line position N, which has been decompressed and is in a printable state, is present in the data buffer. In the present embodiment, the data buffer is formed in the RAM 34, for example. Moreover, when a plurality of images is present at the print line position N, it is determined whether or not the image data of the entire images are present in the data buffer.

When the image data corresponding to the print line position N is not present in the data buffer (No in step S92), the image processing apparatus 10 performs Huffman decompression processing (step S94) and inverse quantization processing (step S96) on the image data corresponding to the print line position N using a Huffman table and a quantization table. Moreover, the image processing apparatus 10 further performs inverse-DCT (discrete cosine transform) processing (step S98) and converts the image data defined in a YCC color space to image data defined in an RGB color space (step S100). Thereafter, the image processing apparatus 10 stores the obtained image data in the data buffer formed in the RAM 43 (step S102).

Next, as illustrated in FIG. 6, the image processing apparatus 10 determines whether the image as the processing subject needs to be rotated (step S110). When the image as the processing subject needs to be rotated (Yes in step S110), the image processing apparatus 10 updates the rotation information map (step S112). On the other hand, when the image as the processing subject does not need to be rotated (No in step S110), the processing of step S112 is skipped.

Thereafter, the image processing apparatus 10 updates and saves the file pointer for identifying the position among the image to which the decompression processing has been performed (step S114).

When it is determined in step S92 or after the processing of step S114 that the image data corresponding to the print line position N is present in the data buffer (Yes in step S92), the image processing apparatus 10 acquires the image data corresponding to the print line position N from the data buffer (step S116.

Next, the image processing apparatus 10 determines whether or not the print line position N corresponds to the ending point of the image as the processing subject (step S118). That is, it is determined whether or not the ending point of the image as the processing subject is included in the print line position N. When the print line position N corresponds to the ending point of the image as the processing subject (Yes in step S118), the image file under the decompression processing is closed and the Huffman table and the quantization table acquired for performing the decompression processing are released (step S120). On the other hand, when the print line position N does not correspond to the ending point of the image as the processing subject (No in step S118), the image processing apparatus 10 skips the processing of step S120.

In this way, the image file decompression processing according to the present embodiment is completed. That is, the processing of step S14 of the print execution processing is completed.

As described above, since the image processing apparatus 10 according to the present embodiment detects the red-eye position using the second reduced size image having the VGA size obtained by enlarging the first reduced size image having the QVGA size, the degree of precision in the red-eye detection is increased. That is, red-eye defects that may have been overlooked when the red-eye detection is performed using the first reduced size image having the smaller QVGA size can be properly detected when the red-eye detection is performed using the second reduced size image having the VGA size obtained by enlarging the first reduced size image.

Moreover, it is highly likely that the first reduced size image having the QVGA size may have been stored in the cache memory by using the idle period of the CPU 20. Therefore, when the first reduced size image having the QVGA has been stored in the cache memory, it is not necessary to additionally generate the first reduced size image having the QVGA size. Accordingly, an increase in the processing time required for the red-eye detection is suppressed.

Furthermore, since the automatic image correction processing and the face recognition processing are performed based on the first reduced size image having the QVGA size, an increase in the processing time required for the automatic image correction processing is suppressed. That is, although the processing-time increases when the automatic image correction processing is performed based on a larger image, since the automatic image correction processing is performed based on the first reduced size image having the QVGA size, an unnecessary increase in the processing time is suppressed.

In addition, when the first reduced size image having the QVGA size is not stored in the cache memory, the first reduced size image having the QVGA size is generated based on the original image. However, since the first reduced size image having the QVGA size is the reduced size image necessary for performing the automatic image correction processing, the necessity of generating the second reduced size image having the QVGA size in order to generate the second reduced size image having the VGA size necessary for the red-eye detection is obviated.

In addition, since the face recognition processing in the automatic image correction processing is performed based on the first reduced size image having the smaller QVGA size, an increase in the processing time required for the face recognition processing and the automatic image correction processing is suppressed. That is, an increase in the processing time by performing the face recognition processing based on the image having the same VGA size as that used for the red-eye position detection is suppressed. For example, the face recognition processing based on the second reduced size image having the VGA size requires about four times the processing time required for the processing based on the first reduced size image having the QVGA size. According to the present embodiment, an increase in the processing time is therefore suppressed.

Although exemplary embodiments of the invention have been described with reference to the accompanying drawings, it should be understood that the invention is not limited to such embodiments. For example, although the embodiment has been described for the case where the first reduced size image has the QVGA size of 320×240 pixels and the second reduced size image having a size larger than the first reduced size image has the VGA size of 640×480 pixels, the size of the first and second reduced size images is not limited to this.

Moreover, although the embodiment has been described for the case where the bi-linear or bi-cubic method is used as the interpolation algorithm for enlarging or reducing the image, the image may be enlarged or reduced using other interpolation algorithms. For example, the first reduced size image may be generated from the original image by a simple thinning method, and the second reduced size image may be generated by simply expanding the data of the first reduced size image. The simple thinning method is an image reduction method that extracts the pixels constituting the original image in units of ten pixels, for example. The simple expansion method is an image enlarging method that increases the number of pixels by allocating the same values to neighboring pixels between the respective pixels constituting the first reduced size image.

Furthermore, the interpolation algorithm used for generating the first reduced size image by reducing the original image is not necessarily the same as the interpolation algorithm used for generating the second reduced size image by enlarging the first reduced size image. For example, the first reduced size image may be generated by reducing the original image using the simple thinning method, and the second reduced size image may be generated from the first reduced size image using the bi-linear method. Alternatively, the first reduced size image may be generated by reducing the original image by the bi-linear method, and the second reduced size image may be generated from the first reduced size image by simply expanding the data of the first reduced size image.

In addition, although in the embodiment described above, the respective sizes of the first reduced size image and the second reduced size image are fixed to the QVGA size and the VGA size, respectively, the sizes thereof may be changed in accordance with a variety of settings. For example, the second reduced size image may be set to the VGA size in a normal print mode similar to the embodiment described above, and the second reduced size image may be set to an XVGA size (1024×768 pixels) in a high-quality print mode. Moreover, the sizes of the first reduced size image and the second reduced size image may be changed based on a remaining capacity of a memory which can be used as the cache memory by the CPU 20.

Furthermore, the image file decompression processing described with reference to FIGS. 4-6 may be executed only in a fast print mode, and the second reduced size image may be generated separately from the original image in a high-precision print mode in order to increase the degree of precision in the red-eye detection. Switching between the modes may be carried out based on a user's command, and alternatively, the second reduced size image may be generated by the method described in the embodiment in the normal print mode while the second reduced size image may be generated separately from the original image in the high-quality print mode.

In addition, a program for executing the print execution processing and the image file decompression processing described in the embodiment may be recorded on a computer-readable recording medium such as a flexible disc, a CD-ROM (compact disc-read only memory), a ROM, or a memory card and distributed in the form of the recording medium. In this case, the above-described embodiment can be realized when the program recorded on the recording medium is read into and executed by the image processing apparatus 10.

Moreover, the image processing apparatus 10 usually has installed therein other programs such as an operating system or other application programs. In this case, in order to utilize other programs provided in the image processing apparatus 10, among the programs of the image processing apparatus 10, a program containing therein instructions for invoking a program that realizes processing equivalent to that of the above-described embodiment may be recorded on the recording medium.

Furthermore, such a program may be distributed, not in the form of the recording medium, but in the form of a carrier wave via a network. When the program distributed in the form of the carrier wave over the network is received and executed by the image processing apparatus 10, the above-described embodiment can be realized.

In addition, when the program is recorded on the recording medium or transmitted as the carrier wave over the network, the program is sometimes encrypted or compressed. In this case, the image processing apparatus 10 that has read the program from the recording medium or the carrier wave needs to decrypt or expand the program prior to executing the program.

In addition, although the embodiment has been described for the case where the print execution processing and the image file decompression processing are realized by software, the respective processing operations may be realized by hardware such as an ASIC (application specific IC). Moreover, the respective processing operations may be realized by cooperation of software and hardware.

What is claimed is:

1. An image processing apparatus comprising:
   first reducing unit that generates a first reduced size image by reducing an original image;
   second reducing unit that generates a second reduced size image having a size larger than that of the first reduced size image and smaller than that of the original image by enlarging the first reduced size image; and
   red-eye correction unit that detects a red-eye position based on the second reduced size image and performing red-eye correction processing based on the detected red-eye position,
   wherein an interpolation algorithm is used that makes image information compressed during reduction of the original image to be embedded in the first reduced size image and that extracts the embedded information when the second reduced size image is generated by enlarging the first reduced size image.

2. The image processing apparatus according to claim 1, wherein an interpolation algorithm used in case that the first reducing unit generates the first reduced size image is the same as an interpolation algorithm used in case that the second reducing means generates the second reduced size image.

3. The image processing apparatus according to claim 1, wherein the first reducing unit generates the first reduced size image using a bi-linear method, and the second reducing unit generates the second reduced size image using the bi-linear method.

4. The image processing apparatus according to claim 1, wherein the first reducing unit generates the first reduced size image using a bi-cubic method, and the second reducing unit generates the second reduced size image using the bi-cubic method.

5. The image processing apparatus according to claim 1, wherein an interpolation algorithm used in case that the first reducing unit generates the first reduced size image is different from an interpolation algorithm used in case that the second reducing unit generates the second reduced size image.

6. The image processing apparatus according to claim 1, further comprising print execution unit that performs a printing operation on an image having been subjected to the red-eye correction processing by the red-eye correction unit.

7. A control method of an image processing apparatus, the method comprising:
generating a first reduced size image by reducing an original image;
generating a second reduced size image having a size larger than that of the first reduced size image and smaller than that of the original image by enlarging the first reduced size image; and
detecting a red-eye position based on the second reduced size image and performing red-eye correction processing based on the detected red-eye position,
wherein an interpolation algorithm is used that makes image information compressed during reduction of the original image to be embedded in the first reduced size image and that extracts the embedded information when the second reduced size image is generated by enlarging the first reduced size image.

8. An image processing apparatus comprising:
first reducing unit that generates a first reduced size image by reducing an original image;
second reducing unit that generates a second reduced size image having a size larger than that of the first reduced size image and smaller than that of the original image by enlarging the first reduced size image; and
red-eye correction unit that detects a red-eye position based on the second reduced size image and performing red-eye correction processing on the first reduced size image based on the detected red-eye position.

9. A control method of an image processing apparatus, the method comprising:
generating a first reduced size image by reducing an original image;
generating a second reduced size image having a size larger than that of the first reduced size image and smaller than that of the original image by enlarging the first reduced size image; and
detecting a red-eye position based on the second reduced size image and performing red-eye correction processing on the first reduced size image based on the detected red-eye position.

* * * * *